United States Patent [19]
Kobayashi et al.

[11] 3,991,642
[45] Nov. 16, 1976

[54] TURRET PRESS

[75] Inventors: Susumu Kobayashi, Uozu; Taibun Nishimoto, Kurobe, both of Japan

[73] Assignee: Yoshida Kogyo K.K., Japan

[22] Filed: Jan. 23, 1976

[21] Appl. No.: 651,853

[30] Foreign Application Priority Data
Feb. 5, 1975 Japan............................ 50-17356[U]

[52] U.S. Cl.................................. 83/559; 83/552; 83/589; 83/598; 83/639
[51] Int. Cl.² ........................................ B26F 1/02
[58] Field of Search ............ 83/559, 552, 589, 598, 83/599, 618, 620, 639; 173/50, 51; 408/35, 43, 44

[56] References Cited
UNITED STATES PATENTS

| | | | |
|---|---|---|---|
| 639,233 | 12/1899 | Hart | 83/620 X |
| 842,729 | 1/1907 | Vernet | 83/552 X |
| 2,196,619 | 4/1940 | Andresen | 83/618 X |
| 3,709,082 | 1/1973 | Leska | 83/618 |

*Primary Examiner*—Frank T. Yost
*Attorney, Agent, or Firm*—Hill, Gross, Simpson, Van Santen, Steadman, Chiara & Simpson

[57] ABSTRACT

A turret press has a bed on which a table is rotatably supported, there being a series of pairs of coactive tools supported on said table, each pair of tools including one tool which extends to the central portion of the table where the same is operatively connected to a power actuator which includes a cylinder which is slidable in a table bore and a piston having a rod directed downwardly for engaging a reaction surface.

16 Claims, 8 Drawing Figures

TURRET PRESS

BACKGROUND OF THE INVENTION

1. Field of the Invention

The present invention relates to a turret press.

2. Prior Art

It is known to provide a turret press with various types of tools. A known type of tool apart from the turret press field constitutes a pair of relatively pivotable cutting blades which can be used to cut off or punch structural bars. Heretofore, it has been known to actuate such blades with a manually movable lever, but because of the inherent nature of such tooling, precision cutting is difficult to achieve. Furthermore, a relatively large inventory of blades is needed to accommodate different classes of work. The use of such type of tooling is tedious, time-consuming, and expensive.

A form of turret press that has been suggested for use on structural bars is shown in U.S. Pat. No. 3,921,486, issued Nov. 25, 1976. With this type of arrangement, the actuator is carried in a large C-frame disposed at one side of the turret, and thus access to the point where cutting is to take place is obstructed, making it difficult to visually check the position of the workpiece with respect to the tooling. The tooling at only one station can be used at a time, and the punching of axially hollow structural bars or members cannot be effected. Further, a relatively large amount of floor space is required with such structure.

SUMMARY OF THE INVENTION

According to the invention, the actuator is mounted on the rotatable table or turret in a central bore and is connected to the movable tools of a series of tools which are simultaneously actuated. Operator access can be had at any one of the tooling stations for any position of the turret and the tooling projects beyond the periphery of the turret in order to receive hollow structural members endwise, or to be received in such members. Preferably the power actuator is a slidable cylinder that actuates all the tools, there being a stationary piston having a rod projecting from the cylinder and engaging a reaction surface. Accordingly, it is an object of the present invention to provide an improved turret press.

Another object of the present invention is to provide a turret press which occupies a minimum amount of floor space.

A still further object of the present invention is to provide a turret press which can act on elongated hollow structural members.

A yet another object of the present invention is to provide a turret press where the operator can take a position at any one of several points around the periphery of the machine for using it.

A still further object of the present invention is to provide a turret press which is so built that it will function with precision and at a high rate of speed.

Many other advantages, features and additional objects of the present invention will become manifest to those versed in the art upon making reference to the detailed description and the accompanying drawings in which a preferred structural embodiment incorporating the principals of the present invention is shown by way of illustrative example.

DETAILED DESCRIPTION

Figure 1:
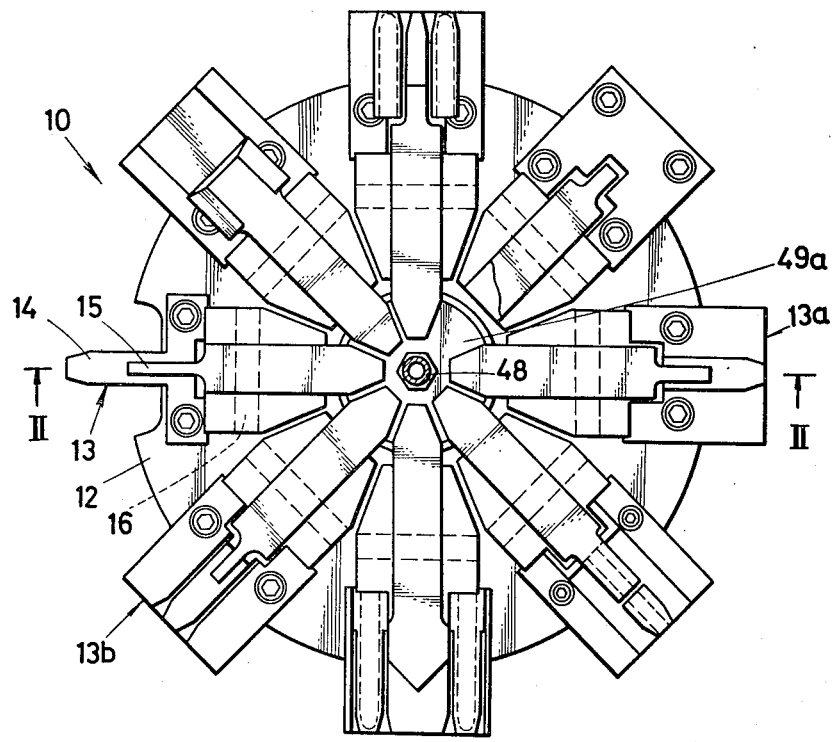
FIG. 1 is a top plan view, with parts broken away, of a turret press provided in accordance with the present invention.
Figure 2:
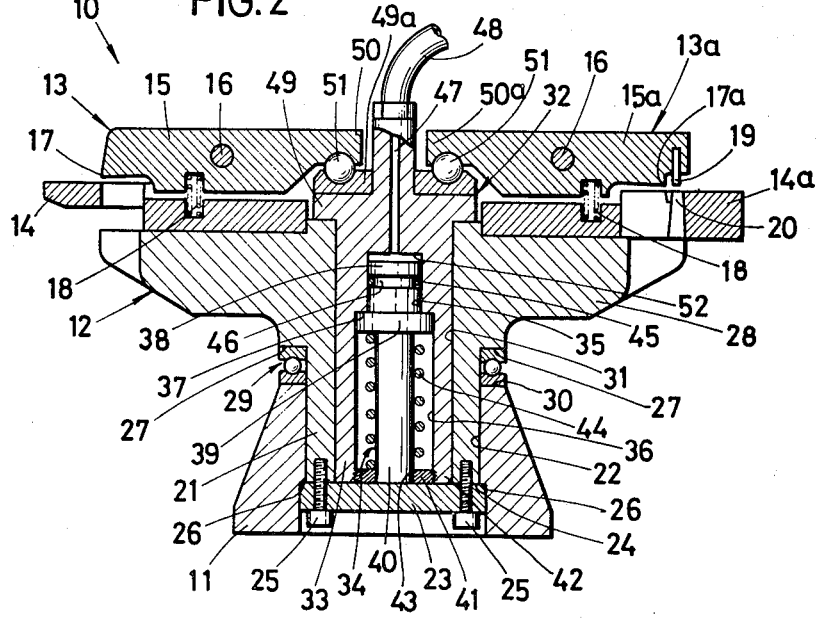
FIG. 2 is a vertical cross-sectional view taken along line II—II of FIG. 1.

The principles of the present invention are particularly useful when embodied in a turret press such as shown in FIGS. 1 and 2, generally indicated by the numeral 10.

The press 10 includes a bed 11, a table 12, a series of pairs of coactive tools 13, 13a, 13b etc. arranged to be simultaneously actuated by a linear power actuator 32 for acting on the end of a workpiece 53.

The bed 11 has a bore 22 which is internally stepped to provide a downwardly facing shoulder 26, and has a flat upper surface 30 on which an annular bearing assembly 29 is supported.

The table 12 has a central bore 31 which extends downwardly into a tubular portion 21 which is rotatable within the bore 22 of the bed 11. The table 12 has a downwardly facing shoulder 27 which engages the bearing assembly 29 and which, with the bearing 29, encircles the tubular portion 21 of the table. A retaining means 23 in the form of a disc is held by a number of screws 25 against the bottom surface 24 of the table 12. The periphery of the retaining means 23 extends radially beyond the lower end of the tubular portion 21 in overlapping relation to the shoulder 26 in the bed 11. The upper surface of the disc 23 also is a support and reaction surface described below.

Figure 3:
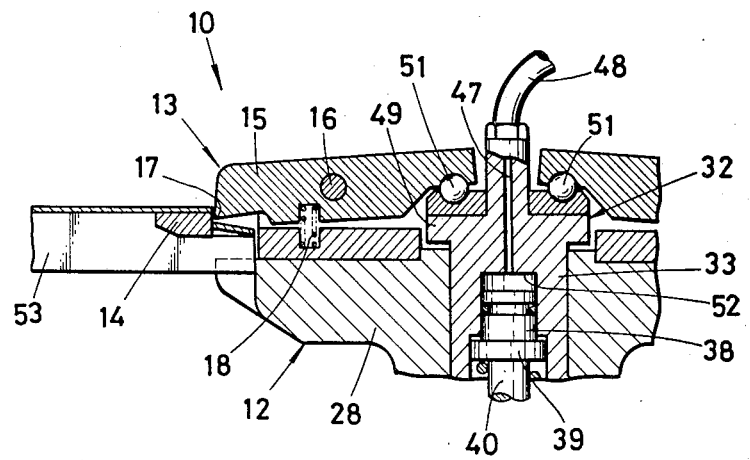
FIG. 3 is a fragmentary portion of FIG. 2 at the end of a power stroke.

Each of the pairs of tools 13 has a cutting edge shaped to provide a desired notch or hole, the shape of which is not here pertinent. The pair of tools 13 is typical and is shown in FIG. 2 in the normal workpiece-receiving position and in FIG. 3 in the operated position. The pair of tools 13 constitutes a punch 15 and a die 14, each of which has an outer end that overhangs the periphery of the table 12 whereby the outer ends of the tools 14, 15, or either one of them, can be received within a hollow structural bar. Thus a movable cutting edge 17 can coact with the die blade 14 on the workpiece as shown in FIG. 3. The movable die 15 extends in a direction away from its cutting edge 17 to the central portion of the table 12. Between the cutting edge 17 and a pivot 16, there is provided a spring 18, one for each of the pairs of tools. The spring 18 performs three functions. First, it acts to raise the outer end of the tool 15 after the cutting is completed and to bias it in an open direction. The second and third purposes are described below.

Most of the tooling illustrated constitutes notching punches. However, other forms of tooling can be used in the press 10. For example, as shown in FIG. 2, the pair of tools 13a is provided with a punch 19 and a die 20 for making a circular aperture. The various tools 13 etc. are thus supported on the upper portion 28 of the table 12.

The power actuator 32 includes a cylinder 33 that can be pressurized with a pressure fluid, the cylinder 33 being slidable in the table bore 31 from the position shown in FIG. 2 to a raised position such as shown in FIG. 3. The cylinder 33 has a bore 35 within which there is a piston 34 having a groove in which there is an O-ring 45 forming a pressure seal with the wall or bore 35. The bore 35 has an enlarged portion 36 defining a shoulder 37 against which an enlarged flange 39 normally engages. From the flange 39, there extends a piston rod 40 which extends slidably through an annular threaded member 41 for engagement with the upper surface of the retaining means 23 which functions as a reaction surface for the end of the piston rod 40. Preferably, a spring 44 acts between the flange 39 and the lower end of the cylinder provided by the annular part 41. The upper surface of the retaining means 41 can thus also provide vertical support for the power actuator assembly 32. If desired, the rod 40, the flange 39 and the piston portion 38 can be constructed as a unit. The element 41, threaded to the lower end 42 of the cylinder 32 and having the opening 43 for the rod 40 thus constitutes the rod-end of the cylinder.

At its other end, the cylinder 33 has a passage-way 47 extending through the end 52 of the bore 35 for conducting pressurized fluid into and out of the pressure chamber at the upper side of the piston 34. The passage-way 47 is connected to a fluid conduit 48 for conducting pressure fluid. The shoulder 37 and the flange 39 thus insure a positive space for fluid pressure at the top of the piston 34.

The cylinder 33 at its upper end has an annular head 49 which can assist in the vertical support of the cylinder 33 and has an upper surface on which a bearing ring 49a is carried. The ring 49a is suitably recessed, as are the inner ends 50, 50a of the tools 15, 15a to receive a second pivot 51 of circular cross-section, here comprising balls. The springs 18 have a second function of holding the inner ends 50, 50a etc., the balls 51, and the bearing ring 49a in snug relation. The springs 18 further act, when compressed as shown in FIG. 3, to assist in the return of the cylinder 33 from its raised position as shown to that of FIG. 2.

Figure 4:
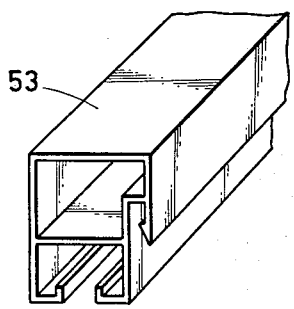
FIGS. 4 through 8 are fragmentary prospective views showing the steps by which the end of a structural bar is progressively notched and punched by the turret press.
Figure 5:
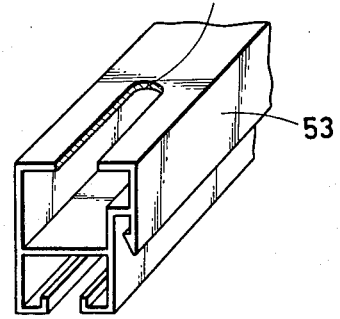
Figure 6:
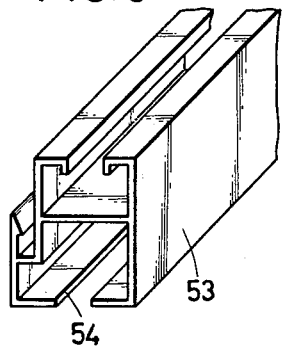
Figure 7:
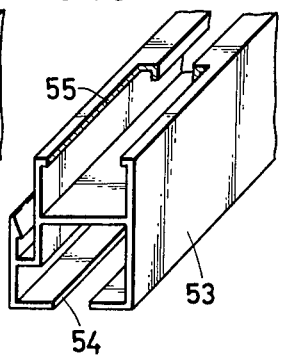
Figure 8:
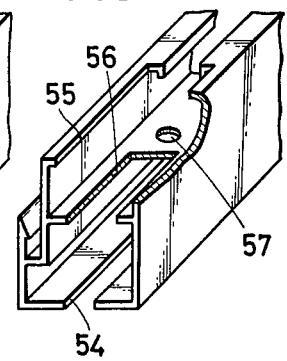

FIGS. 4–8 illustrate the way in which the end of a workpiece 53 is sequentially notched and punched to conform the end thereof for use as a rail in a window or door assembly. The workpiece 53 is first cut to selected length as shown in FIG. 4. A first notch 54 is then provided on one side after which the workpiece is inverted as shown in FIG. 6. The table 12 is rotated to bring a different pair of notching tools to the user, by which the second notch 55 is formed on the other side as shown in FIG. 7. After further table rotation, a third notch 56 and an aperture 57 (shown in FIG. 8) are formed by a third pair of tools, thereby completing the machining of that end of the rail.

With the disclosed construction, the turret press 10 is of minimum size, and where the tools 13 are relatively small, the press can be considered to be portable and can be rotated to any position desired. Since the lower dies 14, 14a etc. are fixed to the table 12, the positioning of the workpieces relative to the tools 13 is easy to perform accurately and maximum precision can be obtained without the use of further tooling or assistance. The portable turret press 10 is particularly advantageous where relatively heavy or long structural bars are to be machined, especially those of hollow configuration.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A turret press, comprising:
    a. a bed;
    b. a table movably supported on said bed;
    c. a plurality of pairs of coactive tools supported on said table, each of said pairs of tools being receptive of a workpiece therebetween, one of said tools of each said pair being movable with respect to the other; and
    d. a power actuator carried on said table and operable simultaneously on said one of said tools of each of said pairs of tools.

2. A turret press according to claim 1 in which each of said tools overhangs the periphery of said table.

3. A turret press according to claim 1 in which said one of said tools is supported by a pivot.

4. A turret press according to claim 3 including a plurality of springs respectively acting between the tools of each of said pairs and biasing the workpiece-engaging portions of said tools apart.

5. A turret press according to claim 3 in which the movement of said power actuator is linear, and including a second pivot between said actuator and said one tool.

6. A turret press according to claim 5 in which said second pivot has a circular cross-section.

7. A turret press according to claim 6 in which said second pivot is a ball.

8. A turret press according to claim 6 including a plurality of springs respectively biasing said one tool, said second pivot and said actuator together.

9. A turret press according to claim 1 in which said one of said tools of each said pairs extends to a central portion of said table and is there coupled to said actuator.

10. A turret press according to claim 1 in which said table has a central bore into which said power actuator extends.

11. A turret press according to claim 10 in which said central bore extends into a tubular portion of said table, said bed having a bore in which said tubular portion is rotatably disposed.

12. A turret press according to claim 11 in which said bore of said bed has a downwardly facing shoulder, and means secured to said tubular portion and engageable with said shoulder for retaining said tubular portion in said bore of said bed.

13. A turret press according to claim 1 in which said power actuator comprises a fluid-pressurizable cylinder slidably disposed in a bore in said table and coupled to said ones of said tools, and a piston in a bore of said cylinder, said piston having a rod extending from said cylinder and engageable with a reaction surface on said table.

14. A turret press according to claim 13 in which said piston has an enlarged flange secured to a non-pressurizable said thereof and engageable with a shoulder in said cylinder for spacing the pressurizable side of said piston from the end of the bore in the cylinder.

15. A turret press according to claim 14 including a spring acting between said cylinder and said flange and normally biasing said flange and said shoulder in said cylinder together.

16. A turret press according to claim 11 including annular bearing means disposed on the upper surface of said bed, encircling said tubular portion, and engaging a downwardly directed annular shoulder on said table.

* * * * *